(12) United States Patent
Shearer et al.

(10) Patent No.: US 11,411,594 B2
(45) Date of Patent: Aug. 9, 2022

(54) VEHICLE TRAINABLE TRANSCEIVER HAVING A PROGRAMMABLE OSCILLATOR

(71) Applicant: Gentex Corporation, Zeeland, MI (US)

(72) Inventors: Carl L. Shearer, Hudsonville, MI (US); Robert R. Turnbull, Holland, MI (US); Thomas D. Klaver, Ada, MI (US)

(73) Assignee: GENTEX CORPORATION, Zeeland, MI (US)

( * ) Notice: Subject to any disclaimer, the term of this patent is extended or adjusted under 35 U.S.C. 154(b) by 56 days.

(21) Appl. No.: 16/862,798

(22) Filed: Apr. 30, 2020

(65) Prior Publication Data

US 2020/0350945 A1 Nov. 5, 2020

Related U.S. Application Data

(60) Provisional application No. 62/840,454, filed on Apr. 30, 2019.

(51) Int. Cl.
*H04B 1/40* (2015.01)
*H04B 1/403* (2015.01)

(52) U.S. Cl.
CPC .............. *H04B 1/40* (2013.01); *H04B 1/403* (2013.01)

(58) Field of Classification Search
CPC .................................. H04B 1/40; H04B 1/403
See application file for complete search history.

(56) References Cited

U.S. PATENT DOCUMENTS

| 5,442,340 | A |   | 8/1995  | Dykema |
|-----------|---|---|---------|--------|
| 5,479,155 | A |   | 12/1995 | Zeinstra et al. |
| 5,583,485 | A |   | 12/1996 | Van Lente et al. |
| 5,614,891 | A | * | 3/1997  | Zeinstra ................ G08C 17/02 340/13.24 |
| 5,619,190 | A |   | 4/1997  | Duckworth et al. |
| 5,627,529 | A |   | 5/1997  | Duckworth et al. |

(Continued)

FOREIGN PATENT DOCUMENTS

| RU | 2214065 | 10/2003 |
|----|---------|---------|
| RU | 2402074 | 10/2010 |

(Continued)

*Primary Examiner* — Zhitong Chen
(74) *Attorney, Agent, or Firm* — Price Heneveld LLP; Brian James Brewer (57) ABSTRACT

A trainable transceiver is provided for a vehicle for transmitting signals to a device remote from the vehicle. The trainable transceiver includes a programmable oscillator for generating a signal having a selected reference frequency; an RF transceiver that receives an RF signal during a training mode in order to learn characteristics of the received RF signal, and transmits an RF signal to the remote device in an operating mode where the transmitted RF signal includes the learned characteristics of the received RF signal, wherein the RF transceiver receives the reference frequency from the programmable oscillator and uses the reference frequency to learn the characteristics of the received RF signal and for generating the transmitted RF signal; and a controller that, during the operating mode, selects frequency control data representing a frequency and selects the selected reference frequency for the programmable oscillator as a function of the frequency control data.

16 Claims, 4 Drawing Sheets

(56) References Cited

U.S. PATENT DOCUMENTS

| | | |
|---|---|---|
| 5,646,701 A | 7/1997 | Duckworth et al. |
| 5,661,804 A | 8/1997 | Dykema et al. |
| 5,686,903 A | 11/1997 | Duckworth et al. |
| 5,699,054 A | 12/1997 | Duckworth |
| 5,699,055 A | 12/1997 | Dykema et al. |
| 5,793,300 A | 8/1998 | Suman et al. |
| 5,854,593 A | 12/1998 | Dykema et al. |
| 5,903,226 A | 5/1999 | Suman et al. |
| 5,940,000 A | 8/1999 | Dykema |
| 6,028,537 A | 2/2000 | Suman et al. |
| 6,091,343 A | 7/2000 | Dykema et al. |
| 6,965,757 B2 | 11/2005 | Eray |
| 6,978,126 B1 | 12/2005 | Blaker et al. |
| 7,197,278 B2 | 3/2007 | Harwood et al. |
| 7,266,204 B2 | 9/2007 | Watson et al. |
| 7,469,129 B2 | 12/2008 | Blaker et al. |
| 7,532,965 B2 | 5/2009 | Robillard et al. |
| 7,778,604 B2 | 8/2010 | Bauman et al. |
| 7,786,843 B2 | 8/2010 | Witkowski |
| 7,864,070 B2 | 1/2011 | Witkowski et al. |
| 7,889,050 B2 | 2/2011 | Witkowski |
| 7,911,358 B2 | 3/2011 | Bos et al. |
| 7,970,446 B2 | 6/2011 | Witkowski et al. |
| 3,000,667 A1 | 8/2011 | Witkowski et al. |
| 8,049,595 B2 | 11/2011 | Olson et al. |
| 8,165,527 B2 | 4/2012 | Sims et al. |
| 8,174,357 B2 | 5/2012 | Geerlings et al. |
| 8,253,528 B2 | 8/2012 | Blaker |
| 8,264,333 B2 | 9/2012 | Blaker et al. |
| 8,384,580 B2 | 2/2013 | Witkowski et al. |
| 8,494,449 B2 | 7/2013 | Witkowski et al. |
| 8,531,266 B2 | 9/2013 | Shearer et al. |
| 8,643,481 B2 | 2/2014 | Campbell et al. |
| 8,760,267 B2 | 6/2014 | Bos et al. |
| 2002/0044065 A1 | 4/2002 | Quist et al. |
| 2005/0046545 A1 | 3/2005 | Skekloff et al. |
| 2006/0126197 A1 | 6/2006 | Drummond et al. |
| 2006/0181428 A1* | 8/2006 | Blaker ............... G07C 9/00182 340/5.71 |
| 2007/0060079 A1 | 3/2007 | Nakagawa et al. |
| 2007/0167138 A1 | 7/2007 | Bauman et al. |
| 2008/0062000 A1 | 3/2008 | Styers et al. |
| 2009/0021348 A1 | 1/2009 | Farris et al. |
| 2009/0315751 A1 | 12/2009 | Bennie et al. |
| 2010/0171588 A1 | 7/2010 | Chutorash et al. |
| 2010/0210220 A1 | 8/2010 | Chutorash et al. |
| 2011/0025456 A1 | 2/2011 | Bos et al. |
| 2011/0112969 A1 | 5/2011 | Zaid et al. |
| 2011/0248866 A1 | 10/2011 | Chutorash et al. |
| 2012/0110365 A1* | 5/2012 | Wong .................. G06F 13/385 713/501 |
| 2013/0147616 A1 | 6/2013 | Lambert et al. |
| 2013/0151977 A1 | 6/2013 | Arteaga-King et al. |
| 2014/0009263 A1 | 1/2014 | Shearer et al. |
| 2014/0111315 A1 | 4/2014 | Geerlings et al. |
| 2014/0118119 A1 | 5/2014 | Geerlings et al. |
| 2015/0137941 A1 | 5/2015 | Bauer et al. |
| 2015/0302730 A1 | 10/2015 | Geerlings et al. |
| 2015/0302738 A1 | 10/2015 | Geerlings et al. |
| 2019/0209022 A1 | 7/2019 | Sobol et al. |
| 2020/0399120 A1* | 12/2020 | Sone .................. B81C 1/00269 |

FOREIGN PATENT DOCUMENTS

| | | |
|---|---|---|
| WO | 2004077729 A2 | 9/2004 |
| WO | 2008079811 | 7/2008 |

\* cited by examiner

VEHICLE TRAINABLE TRANSCEIVER HAVING A PROGRAMMABLE OSCILLATOR

CROSS-REFERENCE TO RELATED APPLICATION

This application claims priority to and the benefit under 35 U.S.C. § 119(e) of U.S. Provisional Patent Application No. 62/840,454, filed on Apr. 30, 2019, entitled "VEHICLE TRAINABLE TRANSCEIVER HAVING A PROGRAMMABLE OSCILLATOR," by Carl L. Shearer et al., the entire disclosure of which is incorporated herein by reference.

FIELD OF THE INVENTION

The present invention generally relates to trainable transceivers for vehicles, and more particularly, trainable transceivers for transmitting radio frequency (RF) signals to a device remote from the vehicle.

SUMMARY OF THE INVENTION

According to one aspect of the present invention, a trainable transceiver is provided for transmitting signals to a remote device. The trainable transceiver comprises: a programmable oscillator for generating a signal having a selected reference frequency; an RF transceiver configured to receive an RF signal during a training mode in order to learn characteristics of the received RF signal, and to transmit an RF signal to the remote device in an operating mode where the transmitted RF signal includes the learned characteristics of the received RF signal, wherein the RF transceiver receives the reference frequency from the programmable oscillator and uses the reference frequency to learn the characteristics of the received RF signal and for generating the transmitted RF signal; and a controller coupled to the RF transceiver and the programmable oscillator, wherein during the training mode, the controller is configured to select frequency control data representing a frequency for a reference signal to be compared by the RF transceiver to the received RF signal and to select the selected reference frequency of the signal generated by the programmable oscillator as a function of the frequency control data.

According to another aspect of the present invention, a trainable transceiver is provided for transmitting signals to a remote device. The trainable transceiver comprises: a programmable oscillator for generating a signal having a selected reference frequency; an RF transceiver configured to receive an RF signal during a training mode in order to learn characteristics of the received RF signal, and to transmit an RF signal to the remote device in an operating mode where the transmitted RF signal includes the learned characteristics of the received RF signal, wherein the RF transceiver receives the reference frequency from the programmable oscillator and uses the reference frequency to learn the characteristics of the received RF signal and for generating the transmitted RF signal; and a controller coupled to the RF transceiver and the programmable oscillator, wherein during the training mode, the controller is configured to select frequency control data representing a frequency for a reference signal to be compared by the RF transceiver to the received RF signal and to select the selected reference frequency of the signal generated by the programmable oscillator as a function of the frequency control data.

According to another aspect of the present invention, a method is provided for training a trainable transceiver to learn at least a frequency and code of an RF signal received from an original remote transmitter, The trainable transceiver having a programmable oscillator and an RF transceiver. The method comprising: (a) receiving the RF signal in the RF transceiver; (b) selecting a frequency for a reference signal that the RF transceiver compares to the received RF signal; (c) selecting a reference frequency for the programmable oscillator based on the selected frequency; (d) determining if there is an approximate match of the frequency of the reference signal and the frequency of the received RF signal; (e) repeating steps (a)-(d) while varying the frequency of the reference signal and selecting a corresponding reference frequency of the programmable oscillator until such time that it is determined in step (d) that there is a frequency match; and (f) demodulating the received RF signal using the reference signal to obtain a code within the received RF signal.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale, and certain components are enlarged relative to the other components for purposes of emphasis and understanding.

The terms "including," "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element preceded by "comprises . . . a" does not, without more constraints, preclude the existence of additional identical elements in the process, method, article, or apparatus that comprises the element.

As noted above, the embodiments described below pertain to a trainable transceiver. Vehicle-installed trainable RF transceivers are known that are capable of learning characteristics of an RF signal transmitted by an original portable garage door opener transmitter that typically comes with a garage door opener (GDO). Once the trainable RF transceiver learns the characteristics, it may then transmit an RF signal having the characteristics to the GDO, which responds to the RF signal in the same manner as if transmitted from the original portable GDO transmitter. Examples of such known trainable RF transceivers are disclosed in commonly-assigned U.S. Pat. Nos. 5,442,340; 5,479,155; 5,583,485; 5,614,891; 5,619,190; 5,627,529; 5,646,701; 5,661,804; 5,686,903; 5,699,054; 5,699,055; 5,793,300; 5,854,593; 5,903,226; 5,940,000; 6,091,343; 6,965,757; 6,978,126; 7,469,129; 7,786,843; 7,864,070; 7,889,050; 7,911,358; 7,970,446; 8,000,667; 8,049,595; 8,165,527; 8,174,357; 8,531,266; 8,494,449; 8,384,580; 8,264,333; and 8,253,528, the entire disclosures of which are incorporated herein by reference. The trainable RF transceivers disclosed in these patents are sold commercially as HomeLink® trainable RF transceivers available from Gentex Corporation of Zeeland, Mich. Such trainable RF transceivers are capable of learning characteristics of the RF signal that include not only the RF carrier frequency, data code and modulation, but also any characteristics needed to learn and generate a rolling code. See the above-identified U.S. Pat. No. 5,661,804, for example. One recent trainable transceiver is further capable of communicating with remote devices including a GDO over the Internet. An example of such a trainable transceiver is disclosed in commonly-assigned United States Patent Application Publication No. 2015/0137941 A1, the entire disclosure of which is incorporated herein by reference.

Figure 4:
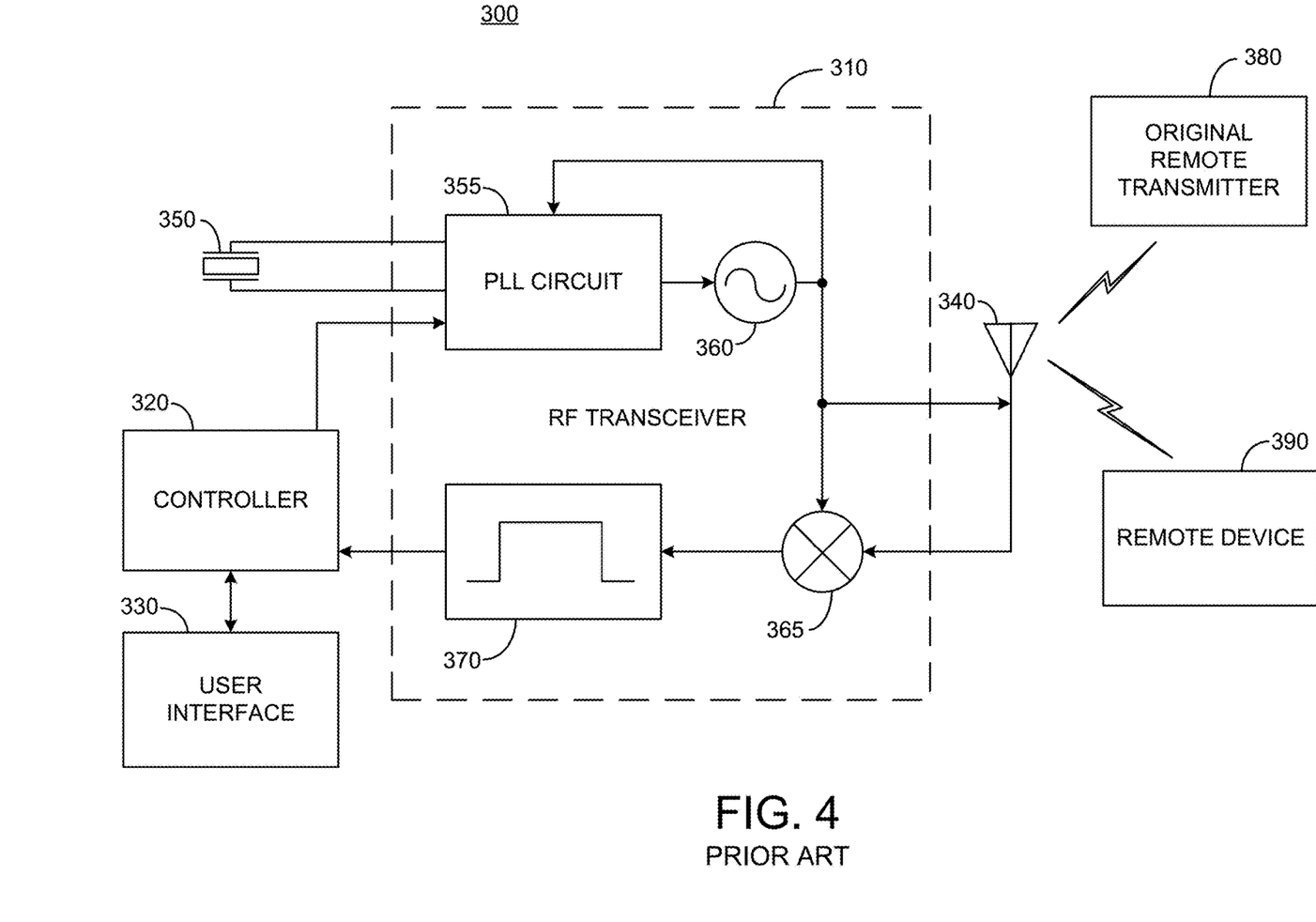
FIG. 4 is a block diagram showing construction of a prior art trainable transceiver.

Of the above noted patent documents, U.S. Pat. Nos. 5,854,593 and 6,091,343 disclose details of a trainable RF transceiver that is used to learn the characteristics of a received RF signal during a training mode and to transmit an RF signal to a remote device in an operating mode where the transmitted RF signal includes the learned characteristics of the received RF signal. A generalized representation of the prior art is shown in FIG. 4. As shown in FIG. 4, the prior art trainable transceivers 300 included an RF transceiver 310, a controller 320, a user interface 330, at least one antenna 340, and a crystal oscillator 350. As described in more detail in the above patents, the RF transceiver 300 may include a phase-locked loop (PLL) circuit 355, a voltage controlled oscillator (VCO) 360, a mixer 365, and a band pass filter 370 amongst other components.

To initiate the training mode, a user would press and hold a pushbutton or the like of the user interface 330 while pressing the transmit button on an original remote transmitter 380 associated with a remote device 390 (such as a GDO, for example). The original remote transmitter 390 would then transmit an RF signal having a particular code and frequency. As explained in detail below, the trainable RF transceiver receives the RF signal and then identifies the frequency and demodulates the received RF signal to obtain the code. The data representing the frequency and code are then stored in memory as channel data in association with the pushbutton that was held. To initiate the operating mode whereby the learned RF signal is to be transmitted, the user presses and releases the same pushbutton that was used to initiate the training mode. The controller 320 responds by reading the associated channel data from memory and controls the RF transceiver 310 to transmit an RF signal having the learned characteristics to the remote device 390 for control thereof. Additional details of how the trainable RF transceiver operates is discussed below.

In general, during a training mode, the received RF signal is received from the original remote transmitter 380 by the antenna 340 and supplied to the mixer 365, which mixes the received RF signal with a reference signal. The reference signal is generated using the crystal oscillator 350, the PLL circuit 355, and the VCO 360. The output of the mixer 365 is supplied to the band pass filter 370, which passes a narrow bandwidth so that a signal passes out of the band pass filter 370 to the controller 320 only if the frequencies of the received RF signal and the reference signal are within a relatively close range of one another. The controller 320 controls the PLL circuit 355 to, in turn, control the VCO 360 so as to generate a reference signal with the desired frequency. During the training mode, the controller 320 will vary the frequency of the reference signal until such time that a signal is received from the band pass filter 370 thus indicating that the frequency of the reference signal is within close range of the received RF signal. The controller 320 may then make smaller adjustments to the frequency of the reference signal to have a closer match to the received RF signal. At this point, the signal output from the band pass filter represents the demodulated code that may be stored in memory for subsequent use in replicating the received RF signal during an operating mode. The controller 320 also stores the data as last sent to the PLL circuit 355 as a representation of the frequency of the received RF signal. Thus, this same data may be subsequently applied to the PLL circuit 355 during an operating mode to generate a carrier signal having the same frequency as the received RF signal.

As disclosed in the above-mentioned U.S. Pat. No. 6,091,343, additional characteristics of the received RF signal may also be learned such as the modulation type (amplitude modulation (AM) or frequency modulation (FM)). In addition, if the original remote transmitter 380 and the remote device 390 communicate using a rolling code, the encryption algorithm, encryption keys, and rolling code counter used to generate the rolling code should be identified as disclosed in the above-mentioned U.S. Pat. No. 5,661,804.

As described above, the controller 320 controls the PLL circuit 355 to, in turn, control the VCO 360 so as to generate a signal with the desired frequency. The PLL circuit 355 receives frequency control data from the controller 320 representing the desired frequency and the PLL circuit 355 provides a signal to the VCO 360 causing it to generate a VCO output signal, which is fed back to the PLL circuit 355 via a feedback loop. The PLL circuit 355 also receives a reference oscillating signal having a fixed reference frequency from the crystal oscillator 350. The PLL circuit 355 divides the fixed reference frequency of the reference oscillating signal and also separately divides the frequency of the VCO output signal in accordance with a ratio dictated by the frequency control data supplied by the controller 320. The PLL circuit 355 then compares the divided reference frequency with the divided VCO output frequency to determine whether the voltage applied to the VCO 360 needs to be increased or decreased to adjust the VCO output frequency to correspond to the divided reference frequency.

As described above, the crystal oscillator 350 has been used to generate a fixed reference frequency such as 30 MHz. Crystal oscillators 350 have been used because they reliably generate the fixed reference frequency in a variety of conditions in which VCOs may vary in frequency in differing operating conditions. However, such a 30 MHz crystal oscillator generates harmonics at multiples of 30 MHz. This can make training difficult at 300 MHz and 390 MHz, which are common GDO frequencies because the harmonic of the generated reference signal may cause a false identification of the frequency of the signal to be learned. Crystal oscillators having different frequencies have been considered; however, they generate harmonics at some other frequency used by GDO systems. As described below, the present innovation uses a Micro-Electrical-Mechanical Systems (MEMS) programmable oscillator that can be programmed on the fly to generate different reference frequencies. With this, a programmable oscillator could operate at 30 MHz in most cases, for example, and switch to another frequency if the trainable transceiver determines that a GDO system is being masked at 300 MHz or 390 MHz. Also, by varying the frequency of the programmable oscillator, the frequency of the harmonics also changes. Thus, if during training, a frequency is identified as possibly corresponding to that of the signal to be learned, the frequency of the programmable oscillator may be changed while the trainable transceiver generates a reference signal at the same frequency as before. If the trainable transceiver no longer detects the incoming signal, the possible frequency match was falsely generated based on a harmonic. However, if the incoming signal is still detected, a frequency match may be confirmed. In other words, changing the reference oscillator frequency can be used to distinguish the real signal frequency from its image frequencies.

Another problem with trainable transceivers (IF and Direct Conversion) having a 30 MHz crystal oscillator is that they may generate relatively strong mixing products with harmonic frequencies of around 870 MHz, which makes them difficult to certify in Europe. However, by being able to vary the frequency of the reference oscillator, mixing products having frequencies around 870 MHz can be avoided.

Current trainable transceivers (IF and Direct Conversion) that generate multiple harmonics could desensitize the receiver of the trainable transceiver. With a 30 MHz crystal, harmonics at 300 MHz and 390 MHz may be generated, which are used frequencies for garage door openers in North America. So when the prior trainable transceivers train at those two frequencies with a 30 MHz reference oscillator, the receiver may be desensitized by the noise at those harmonics, which makes the harmonics hard to distinguish.

Figure 1:
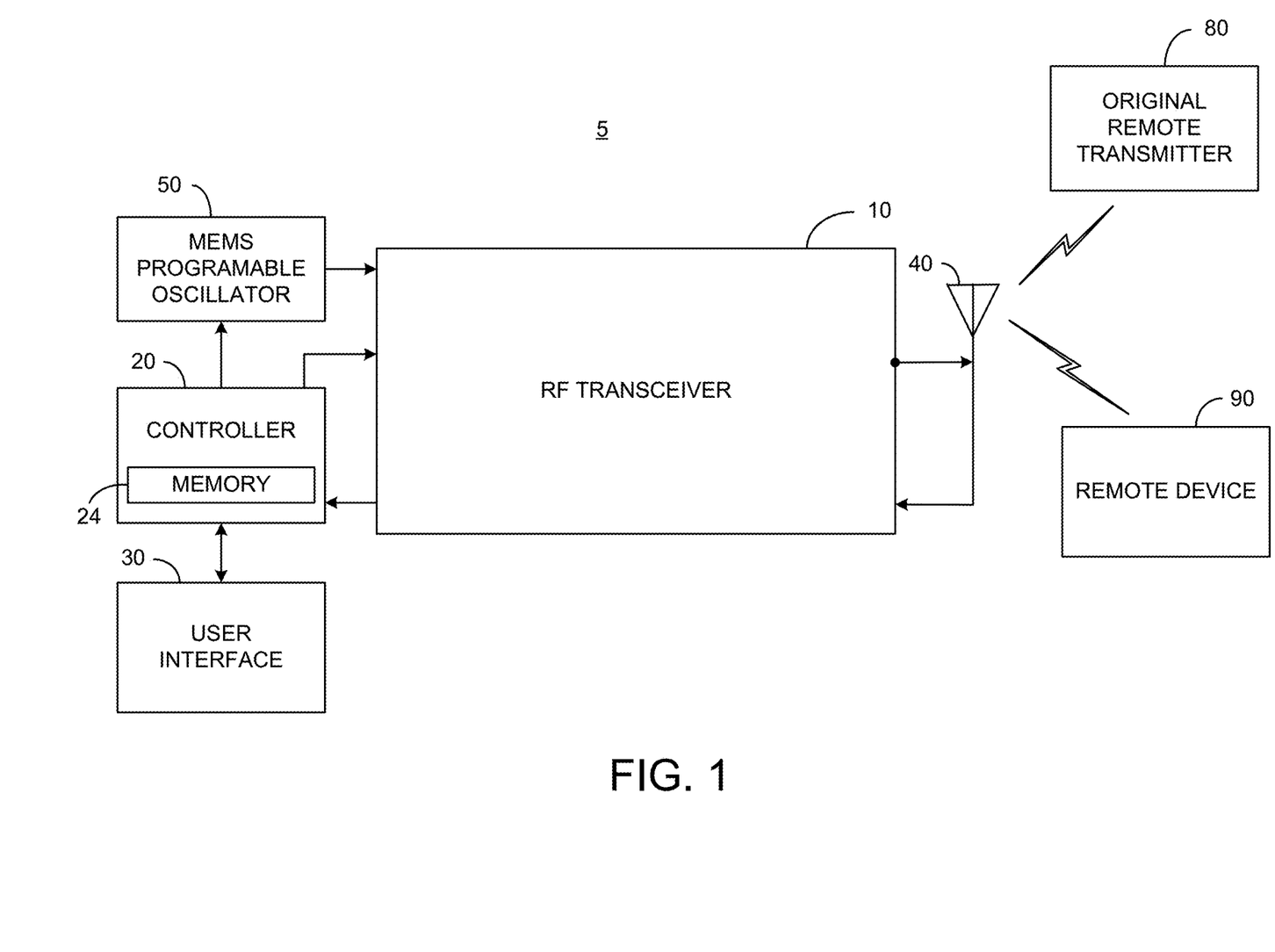
FIG. 1 is a block diagram showing a trainable transceiver according to a first embodiment.

FIG. 1 shows an example of a trainable transceiver 5 according to a first embodiment. As shown, the trainable transceiver 5 includes an RF transceiver 10, a controller 20, a user interface 30, at least one antenna 40, and a MEMS programmable oscillator 50. The RF transceiver 5 may be constructed as discussed below with respect to FIG. 2 or may be an application specific integrated circuit (ASIC) that functions in a similar manner.

Figure 2:
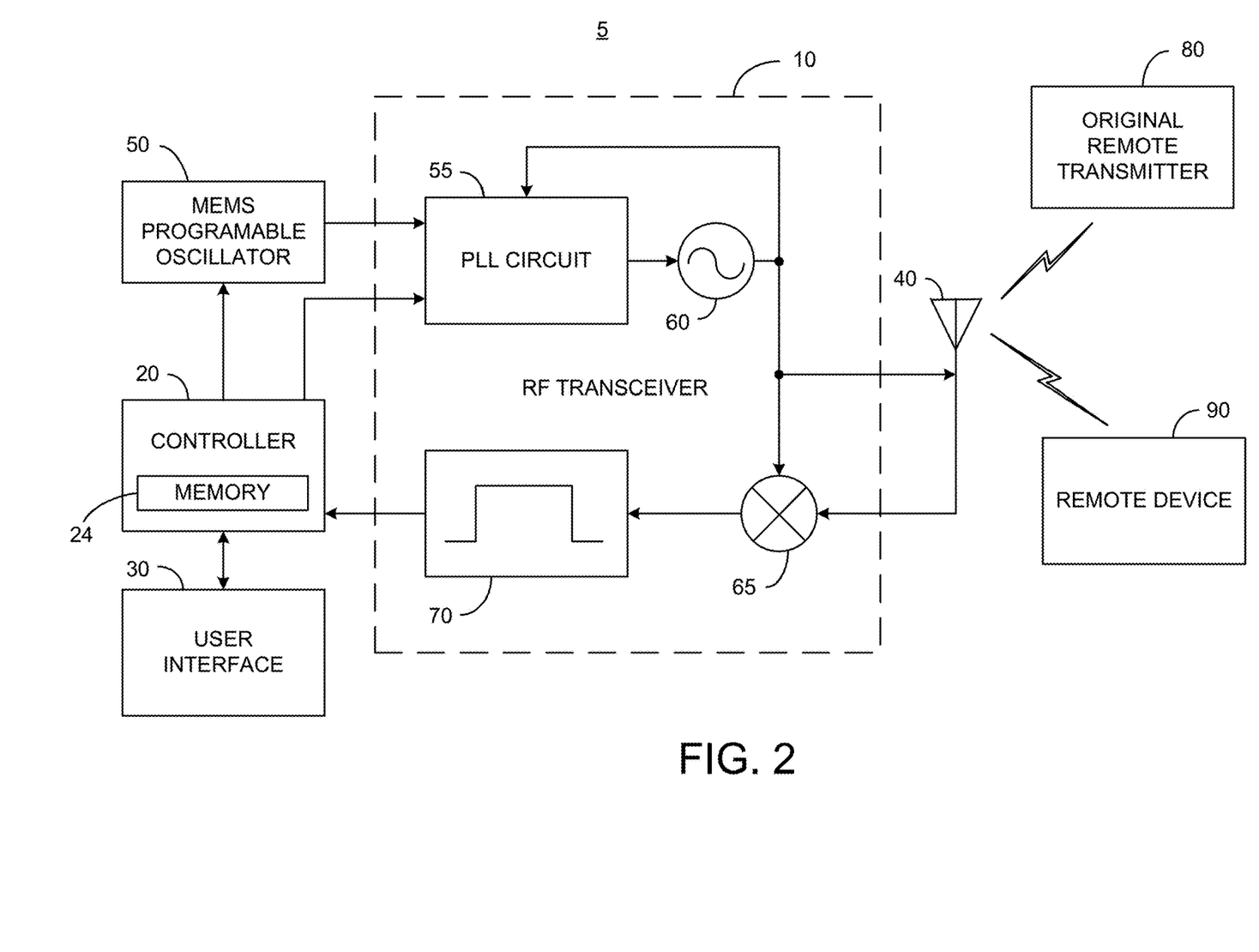
FIG. 2 is a block diagram showing exemplary details of the trainable transceiver of FIG. 1.

As shown in FIG. 2, the RF transceiver 10 may include a phase-locked loop (PLL) circuit 55, a voltage controlled oscillator (VCO) 60, a mixer 65, and a band pass filter 70 amongst other components.

During a training mode, an RF signal is received from the original remote transmitter 80 by the antenna 40 and supplied to the RF transceiver 10 (specifically to the mixer 65), which compares the frequency of the received RF signal with that of a reference signal. The reference signal is generated by the RF transceiver 10 (specifically, the VCO 60 and PLL circuit 55) using the reference frequency supplied by the MEMS programmable oscillator 50. The RF transceiver 10 thus receives the reference frequency from the programmable oscillator 50 and uses the reference frequency to learn the characteristics of the received RF signal. The results of the comparison are output to the controller 20 (through the bandpass filter 70). The controller 20 controls the RF transceiver 10 to generate a reference signal with the desired frequency. During the training mode, the controller 20 varies the frequency control data supplied to the RF transceiver 10 (specifically to the PLL circuit 55) to vary the frequency of the reference signal until such time that a signal is received from the RF transceiver 10 (specifically from filter 70) thus indicating that the frequency of the reference signal is within close range of the received RF signal. The controller 20 may generate frequency control data that then causes smaller adjustments to the frequency of the reference signal to have a closer match to the received RF signal. At this point, the signal output from the RF transceiver 10 represents the demodulated code that may be stored in memory for subsequent use in replicating the received RF signal during an operating mode. The controller 20 also stores the frequency control data as last sent to the RF transceiver 10 as a representation of the frequency of the received RF signal. Thus, this same data may be subsequently applied to RF transceiver 10 (specifically the PLL circuit 55) during an operating mode to generate a carrier signal having the same frequency as the received RF signal. In other words, during the operating mode, the controller 20 is configured to select frequency control data representing a frequency for an RF signal to be transmitted by the RF transceiver 10 and to select the reference frequency of the signal generated by the programmable oscillator 50 as a function of the frequency control data.

In order to solve the problem mentioned above regarding the phase noise generated at multiples of the reference frequency, the controller 20 may select different reference frequencies for the programmable oscillator 50 to generate as a function of the frequency control data sent to the RF transceiver 10 and hence as a function of the frequency of the reference signal to be generated by the RF transceiver 10. For example, the controller 20 may select a reference frequency of 40 MHz for frequencies that are at or near a multiple of 30 MHz, and may select a reference frequency of 30 MHz for all other frequencies. The controller 20 may be configured to store a look-up table that correlates reference frequencies with frequencies for the reference signal so that the controller 20 may select an appropriate reference frequency for any given frequency to be generated by the RF transceiver 10 whether in a training mode or in an operating mode.

An example of a suitable MEMS programmable oscillator 50 is a 1 to 340 MHz Elite Platform™ I²C/SPI Programmable Oscillator, Part No. SiT3521 available from SiTime Corporation of Santa Clara, Calif.

In some embodiments, the controller 20 may comprise a memory 24, which may be configured to store programming information defining the signals that may be communicated from the trainable transceiver 5. The controller 20 may comprise one or more processors, which may be implemented as general purpose processors, microprocessors, microcontrollers, ASICs, or other suitable electronic processing components.

The memory 24 may include one or more devices (e.g., RAM, ROM, Flash® memory, hard disk storage, etc.) for storing data and/or computer code for completing and/or facilitating the various processes, layers, and modules described in the present disclosure. The memory 24 may comprise volatile memory or non-volatile memory. In various embodiments, the memory 24 may include look-up tables, database components, object code components, script components, or any other type of information structure for supporting the various activities and information structures described herein.

Figure 3:
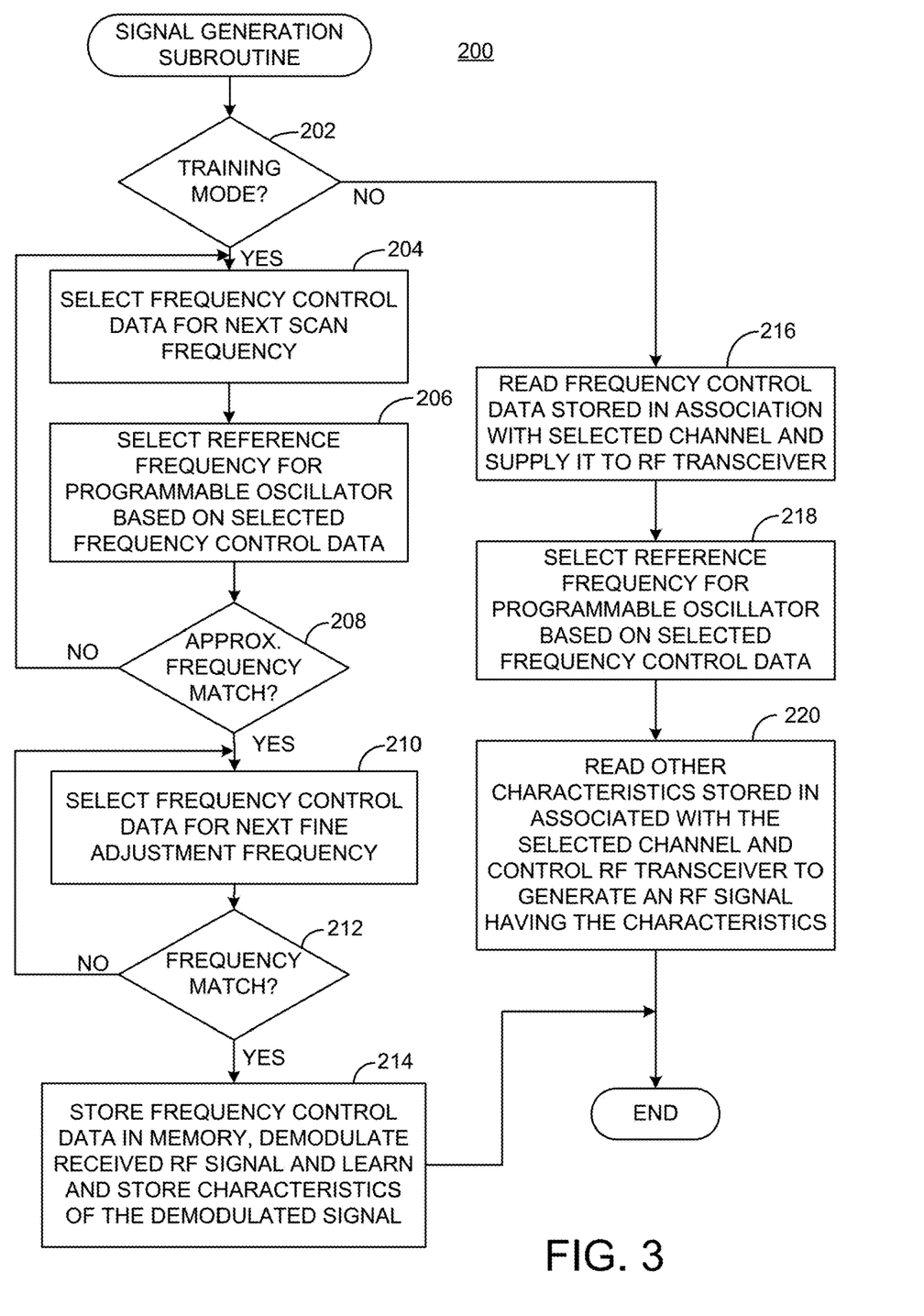
FIG. 3 is a flow chart illustrating a method of operation of the trainable transceiver of FIG. 1.

A method 200 for generating a reference signal in a trainable transceiver 5 is shown in FIG. 3 and described further below. The method 200 is described herein as being implemented by the controller 20 using the components described above. This method may be a subroutine executed by any processor, and thus this method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media in the form of the memory 24 of the controller 20 (or locally associated with the controller 20 or some other processor) typically prior to being installed in a vehicle.

The method 200 begins when the controller 20 receives a signal from the user interface 30 at which point the controller 20 determines whether it is in the training mode in step 202. As noted above, the controller 20 will be able to determine if it is in the training mode based on whether a pushbutton or the like of user interface 30 has been depressed for at least a predetermined time period. If in a training mode, the controller 20 selects frequency control data to supply to the RF transceiver 10 corresponding to the first frequency of the frequency scan in step 204. Then, in step 206, the controller 20 selects a reference frequency for the programmable oscillator 50 based on the selected frequency control data in step 206. In step 208, the controller 20 determines if there is an approximate match of the frequency of the reference signal generated by the RF transceiver 10 and the frequency of the received RF signal from the original remote transmitter 80. The controller 20 will be able to make this determination based on a signal received from the RF transceiver 10. If there is no approximate frequency match, the controller 20 selects different frequency control data for the next scan frequency in step 204 and repeats steps 204-206 while varying the frequency control data and the reference frequency of the programmable oscillator 50 (if needed) until such time that the controller 20 determines that there is an approximate frequency match. At this point, the controller 20 may optionally make fine adjustments to the frequency control data to find the best frequency match in steps 210 and 212. Once the best frequency match is determined, in step 214, the controller 20 stores the frequency control data used to obtain the best frequency match in memory 24 in association with a channel corresponding to the pushbutton that was depressed to initiate training. With the best frequency match obtained, the signal supplied by the RF transceiver 10 to the controller 20 represents a demodulated form of the received RF signal. The controller 20 may then learn and store characteristics of the demodulated signal in a manner as known in the art.

If in step 202 the controller 20 determines that it is not in the training mode, it determines that it is in the operating mode and thus proceeds to step 216 in which it reads frequency control data stored in memory 24 in association with a channel corresponding to the depressed pushbutton. The controller 20 then supplies the frequency control data to the RF transceiver 10. In step 218, the controller 20 selects the reference frequency for the programmable oscillator 50 based on the selected frequency control data. In step 220, the controller 20 reads the other stored characteristics associated with the selected channel and controls the RF transceiver 10 thereby causing it to transmit an RF signal having such characteristics to a remote device 90.

If the trainable transceiver is configured to learn and transmit a frequency modulated (FM) signal, the controller 20 may control the programmable oscillator 50 to vary the reference frequency it outputs to the RF transceiver 10 in accordance with the frequency modulation data (data code and frequency variance). Such control of the programmable oscillator 50 would be in addition to the control performed to select a reference frequency corresponding to the frequency control data used to select the RF carrier frequency of the transmitted RF signal.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited. For example, the length or width of the structures and/or members or other elements of the assembly may be varied. It should be noted that the elements and/or subassemblies of the assembly may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A trainable transceiver for transmitting signals to a remote device, the trainable transceiver comprising:
    a programmable oscillator for generating a signal having a selected reference frequency;
    an RF transceiver configured to receive an RF signal during a training mode in order to learn characteristics of the received RF signal, and to transmit an RF signal to the remote device in an operating mode where the transmitted RF signal includes the learned characteristics of the received RF signal, wherein the RF transceiver receives the reference frequency from the programmable oscillator and uses the reference frequency to learn the characteristics of the received RF signal and for generating the transmitted RF signal; and
    a controller coupled to the RF transceiver and the programmable oscillator, wherein during the operating mode, the controller is configured to:
        select frequency control data representing a frequency for an RF signal to be transmitted by the RF transceiver,
        supply the frequency control data to the RF transceiver,
        select the selected reference frequency of the signal generated by the programmable oscillator as a function of the frequency control data, and
        control the programmable oscillator to generate the signal with the selected reference frequency.

2. The trainable transceiver of claim 1, wherein during the training mode, the controller is configured to select frequency control data representing a frequency for a reference signal to be compared by the RF transceiver to the received RF signal and to select the selected reference frequency of the signal generated by the programmable oscillator as a function of the frequency control data.

3. The trainable transceiver of claim 2, wherein the RF transceiver comprises:
a voltage controlled oscillator for generating the reference signal to be compared by the RF transceiver to the received RF signal;
a phase-locked loop circuit for receiving: the frequency control data from the controller, the signal generated by the programmable oscillator, and the reference signal output from the voltage controlled oscillator, the phase-locked loop circuit generating an output voltage to control the frequency of the reference signal output by the voltage controlled oscillator;
a mixer for receiving the RF signal to be learned and the reference signal output from the voltage controlled oscillator and for generating an output signal; and
a bandpass filter for receiving the output signal from the mixer and generating an incoming signal when the output signal from the mixer is within a pass band of the filter and not generating an incoming signal when the output signal from the mixer is outside the pass band of the filter.

4. The trainable transceiver of claim 2, wherein the controller selects a selected reference frequency of 40 MHz for the signal generated by the programmable oscillator when a frequency for the reference signal to be compared by the RF transceiver to the received RF signal is at or near a multiple of 30 MHz, and the controller selects a selected reference frequency of 30 MHz for the signal generated by the programmable oscillator for all other frequencies for the reference signal to be compared by the RF transceiver to the received RF signal.

5. The trainable transceiver of claim 2, wherein the RF transceiver comprises:
a voltage controlled oscillator for generating the reference signal to be compared by the RF transceiver to the received RF signal.

6. The trainable transceiver of claim 1, wherein the programmable oscillator is a Micro-Electrical-Mechanical Systems programmable oscillator for generating different reference frequencies.

7. The trainable transceiver of claim 1, wherein the controller is configured to store a look-up table that correlates selected reference frequencies for the signal generated by the programmable oscillator with the frequency control data.

8. A trainable transceiver for transmitting signals to a remote device, the trainable transceiver comprising:
a programmable oscillator for generating a signal having a selected reference frequency;
an RF transceiver configured to receive an RF signal during a training mode in order to learn characteristics of the received RF signal, and to transmit an RF signal to the remote device in an operating mode where the transmitted RF signal includes the learned characteristics of the received RF signal, wherein the RF transceiver receives the reference frequency from the programmable oscillator and uses the reference frequency to learn the characteristics of the received RF signal and for generating the transmitted RF signal; and
a controller coupled to the RF transceiver and the programmable oscillator, wherein during the training mode, the controller is configured to:
select frequency control data representing a frequency for a reference signal to be compared by the RF transceiver to the received RF signal,
supply the frequency control data to the RF transceiver,
select the selected reference frequency of the signal generated by the programmable oscillator as a function of the frequency control data, and
control the programmable oscillator to generate the signal with the selected reference frequency.

9. The trainable transceiver of claim 8, wherein during the operating mode, the controller is configured to select frequency control data representing a frequency for an RF signal to be transmitted by the RF transceiver and to select the selected reference frequency of the signal generated by the programmable oscillator as a function of the frequency control data.

10. The trainable transceiver of claim 8, wherein the programmable oscillator is a Micro-Electrical-Mechanical Systems programmable oscillator for generating different reference frequencies.

11. The trainable transceiver of claim 8, wherein the RF transceiver comprises:
a voltage controlled oscillator for generating the reference signal to be compared by the RF transceiver to the received RF signal;
a phase-locked loop circuit for receiving: the frequency control data from the controller, the signal generated by the programmable oscillator, and the reference signal output from the voltage controlled oscillator, the phase-locked loop circuit generating an output voltage to control the frequency of the reference signal output by the voltage controlled oscillator;
a mixer for receiving the RF signal to be learned and the reference signal output from the voltage controlled oscillator and for generating an output signal; and
a bandpass filter for receiving the output signal from the mixer and generating an incoming signal when the output signal from the mixer is within a pass band of the filter and not generating an incoming signal when the output signal from the mixer is outside the pass band of the filter.

12. The trainable transceiver of claim 8, wherein the controller selects a selected reference frequency of 40 MHz for the signal generated by the programmable oscillator when a frequency for the reference signal to be compared by the RF transceiver to the received RF signal is at or near a multiple of 30 MHz, and the controller selects a selected reference frequency of 30 MHz for the signal generated by the programmable oscillator for all other frequencies for the reference signal to be compared by the RF transceiver to the received RF signal.

13. The trainable transceiver of claim 8, wherein the controller is configured to store a look-up table that correlates selected reference frequencies for the signal generated by the programmable oscillator with the frequency control data.

14. The trainable transceiver of claim 8, wherein the RF transceiver comprises:
a voltage controlled oscillator for generating the reference signal to be compared by the RF transceiver to the received RF signal.

15. A trainable transceiver for transmitting signals to a remote device, the trainable transceiver comprising:

a programmable oscillator for generating a signal having a selected reference frequency;

an RF transceiver configured to receive an RF signal during a training mode in order to learn characteristics of the received RF signal, and to transmit an RF signal to the remote device in an operating mode where the transmitted RF signal includes the learned characteristics of the received RF signal, wherein the RF transceiver receives the reference frequency from the programmable oscillator and uses the reference frequency to learn the characteristics of the received RF signal and for generating the transmitted RF signal; and a controller coupled to the RF transceiver and the programmable oscillator, wherein during the operating mode, the controller is configured to select frequency control data representing a frequency for an RF signal to be transmitted by the RF transceiver and to select the selected reference frequency of the signal generated by the programmable oscillator as a function of the frequency control data, wherein during the training mode, the controller is configured to select frequency control data representing a frequency for a reference signal to be compared by the RF transceiver to the received RF signal and to select the selected reference frequency of the signal generated by the programmable oscillator as a function of the frequency control data, wherein, during the training mode, when the controller identifies a frequency as being a possible frequency match to that of the RF signal to be learned as a result of a detection of an incoming signal output from the RF transceiver to the controller, the controller then changes the selected frequency of the signal generated by the programmable oscillator while the trainable transceiver generates a reference signal at the same frequency as before, if the controller no longer detects the incoming signal, the controller determines that the possible frequency match was falsely generated based on a harmonic, and if the incoming signal is still detected, the controller confirms a frequency match.

16. A trainable transceiver for transmitting signals to a remote device, the trainable transceiver comprising:

a programmable oscillator for generating a signal having a selected reference frequency;

an RF transceiver configured to receive an RF signal during a training mode in order to learn characteristics of the received RF signal, and to transmit an RF signal to the remote device in an operating mode where the transmitted RF signal includes the learned characteristics of the received RF signal, wherein the RF transceiver receives the reference frequency from the programmable oscillator and uses the reference frequency to learn the characteristics of the received RF signal and for generating the transmitted RF signal; and a controller coupled to the RF transceiver and the programmable oscillator, wherein during the training mode, the controller is configured to select frequency control data representing a frequency for a reference signal to be compared by the RF transceiver to the received RF signal and to select the selected reference frequency of the signal generated by the programmable oscillator as a function of the frequency control data, wherein, during the training mode, when the controller identifies a frequency as being a possible frequency match to that of the RF signal to be learned as a result of a detection of an incoming signal output from the RF transceiver to the controller, the controller then changes the selected frequency of the signal generated by the programmable oscillator while the trainable transceiver generates a reference signal at the same frequency as before, if the controller no longer detects the incoming signal, the controller determines that the possible frequency match was falsely generated based on a harmonic, and if the incoming signal is still detected, the controller confirms a frequency match.

\* \* \* \* \*